(12) United States Patent
Okada (10) Patent No.: US 8,516,814 B2
(45) Date of Patent: Aug. 27, 2013

(54) EXHAUST GAS PURIFYING APPARATUS FOR A TURBOCHARGED INTERNAL COMBUSTION ENGINE

(75) Inventor: Yoshihiro Okada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 123 days.

(21) Appl. No.: 13/056,989

(22) PCT Filed: Dec. 26, 2008

(86) PCT No.: PCT/JP2008/073683
§ 371 (c)(1),
(2), (4) Date: Feb. 1, 2011

(87) PCT Pub. No.: WO2010/073354
PCT Pub. Date: Jul. 1, 2010

(65) Prior Publication Data
US 2011/0131978 A1    Jun. 9, 2011

(51) Int. Cl.
F02D 23/00    (2006.01)
F02B 37/013    (2006.01)
F02B 37/00    (2006.01)
F02B 37/12    (2006.01)
F01N 5/04    (2006.01)
F01N 3/00    (2006.01)

(52) U.S. Cl.
USPC ................... 60/602; 60/286; 60/280

(58) Field of Classification Search
USPC .............. 60/602, 612, 280, 286; 123/562
IPC .............. F02B 37/00, 37/12, 37/013; F01N 3/20
See application file for complete search history.

(56) References Cited

U.S. PATENT DOCUMENTS
3,292,364 A * 12/1966 Cazier ............................ 60/685
6,276,138 B1 * 8/2001 Welch ............................ 60/602
(Continued)

FOREIGN PATENT DOCUMENTS
EP    1 306 534 A2    5/2003
JP    60019910 A *    2/1985
(Continued)

OTHER PUBLICATIONS
International Search Report issued Mar. 31, 2009 in PCT/JP08/073683 filed Dec. 26, 2008.
(Continued)

Primary Examiner — Thai Ba Trieu
(74) Attorney, Agent, or Firm — Oblon, Spivak, McClelland, Maier & Neustadt, L.L.P.

(57) ABSTRACT

An exhaust gas purifying apparatus for a supercharger-equipped internal combustion engine, which can favorably combine the realization of the prevention of an excessive back pressure rise and the securement of an exhaust gas emission performance, is provided. A turbocharger which includes, in an exhaust passage, a turbine driven by the exhaust energy of an internal combustion engine is provided. In the exhaust passage, a first front stage catalyst and a second front stage catalyst are provided in series in order from the upstream side. A first exhaust bypass passage which bypasses the turbine and a second exhaust bypass passage which bypasses the turbine and the first front stage catalyst are provided. A first waste gate valve and a second waste gate valve are provided which play roles in opening and closing the first exhaust bypass passage and the second exhaust bypass passage, respectively.

2 Claims, 4 Drawing Sheets

(56) References Cited

U.S. PATENT DOCUMENTS

| | | | |
|---|---|---|---|
| 7,571,608 B2 * | 8/2009 | Boyapati et al. | 60/612 |
| 7,877,981 B2 * | 2/2011 | Newman | 60/280 |
| 8,191,354 B2 * | 6/2012 | Cavataio et al. | 60/280 |
| 8,234,864 B2 * | 8/2012 | Easley et al. | 60/602 |
| 2002/0134072 A1 | 9/2002 | Fujieda et al. | 60/280 |
| 2003/0074899 A1 | 4/2003 | Yamaguchi et al. | 60/612 |
| 2007/0193270 A1 * | 8/2007 | Roozenboom et al. | 60/612 |
| 2008/0000228 A1 * | 1/2008 | Kieser | 60/280 |
| 2008/0098733 A1 * | 5/2008 | Dickerson | 60/602 |
| 2008/0209889 A1 * | 9/2008 | Scheinert | 60/286 |
| 2010/0100300 A1 * | 4/2010 | Brooks et al. | 60/602 |
| 2010/0139269 A1 * | 6/2010 | Heyes et al. | 60/602 |
| 2010/0263372 A1 * | 10/2010 | Pagot et al. | 60/602 |
| 2010/0300090 A1 * | 12/2010 | Kratschmer et al. | 60/602 |
| 2011/0302917 A1 * | 12/2011 | Styles et al. | 60/602 |
| 2012/0036847 A1 * | 2/2012 | Schreiber et al. | 60/602 |
| 2012/0291431 A1 * | 11/2012 | Bucknell et al. | 60/602 |

FOREIGN PATENT DOCUMENTS

| | | |
|---|---|---|
| JP | 62 76225 | 5/1987 |
| JP | 63 202729 | 12/1988 |
| JP | 63309726 A * | 12/1988 |
| JP | 01193023 A * | 8/1989 |
| JP | 09 125941 | 5/1997 |
| JP | 11 173138 | 6/1999 |
| JP | 2002 276346 | 9/2002 |
| JP | 2003 129852 | 5/2003 |
| JP | 2004-092413 | 3/2004 |
| WO | WO 2008125579 A1 * | 10/2008 |

OTHER PUBLICATIONS

Office Action issued Aug. 10, 2012, in Chinese Patent Application No. 2008801305349.

Office Action issued Jul. 2, 2013, in European Patent Application No. 08879150.4.

* cited by examiner

EXHAUST GAS PURIFYING APPARATUS FOR A TURBOCHARGED INTERNAL COMBUSTION ENGINE

TECHNICAL FIELD

The present invention relates to an exhaust gas purifying apparatus for a supercharger-equipped internal combustion engine.

BACKGROUND ART

So far, for example, Patent Document 1 discloses an exhaust system of an internal combustion engine which includes a so-called "Twin entry turbocharger". In this internal combustion engine equipped with the twin entry turbocharger, it is arranged such that exhaust gas discharged from one cylinder and exhaust gas discharged from the other cylinder are separately introduced into a turbine via each scroll passage thereof. In addition, the conventional internal combustion engine includes two exhaust bypass passages, which are arranged so as to branch off from each of two scroll passages described above and be introduced into a catalyst after bypassing the turbine, as independent passages from each other.

Including the above-described document, the applicant is aware of the following documents as a related art of the present invention.
[Patent Document 1] Japanese Laid-open Utility Model Application Publication No. S63-202729
[Patent Document 2] Japanese Laid-open Patent Application Publication No. H09-125941
[Patent Document 3] Japanese Laid-open Patent Application Publication No. H11-173138

DISCLOSURE OF INVENTION

Problem to be Solved by the Invention

If a back pressure of the internal combustion engine becomes too high, the following problem may arise. That is to say, if the back pressure of the internal combustion engine becomes high, a residual gas fraction in a cylinder increases. In conjunction therewith, knocking becomes likely to occur because a compression end temperature becomes high. In addition, if the back pressure becomes high, an exhaust gas temperature increases. As a result, increasing a fuel injection quantity in order to suppress a rise in temperatures of exhaust system parts causes the deterioration of fuel economy and the decrease of maximum output power. Furthermore, an exhaust passage is provided with a catalyst for purifying exhaust gas discharged from the cylinder. However, the presence of such catalyst could be a factor of rise in the back pressure.

It is therefore desirable that the rise in the back pressure be effectively suppressed without harming an exhaust gas emission performance of the catalyst when a boost pressure is adjusted by opening an exhaust bypass passage bypassing a turbine in a supercharger-equipped internal combustion engine. In the technique according to the above described Patent Document 1, however, consideration is not sufficiently given to decrease the back pressure when the exhaust bypass passage is used, and therefore the technique needs further improvement.

The present invention has been made to solve the problem as described above, and has its object to provide an exhaust gas purifying apparatus for a supercharger-equipped internal combustion engine, which can favorably combine the realization of the prevention of an excessive back pressure rise and the securement of an exhaust gas emission performance.

Means for Solving the Problem

A first aspect of the present invention is an exhaust gas purifying apparatus for a supercharger-equipped internal combustion engine, the apparatus comprising:
a turbocharger which includes, in an exhaust passage, a turbine which is driven by exhaust energy of the internal combustion engine;
an upstream side catalyst which is disposed in the exhaust passage and purifies exhaust gas;
a downstream side catalyst which is disposed in the exhaust passage at a downstream side of the upstream side catalyst and purifies the exhaust gas;
a first exhaust bypass passage branching off from the exhaust passage at an upstream portion of the turbine while merging again with the exhaust passage at a portion between the turbine and the upstream side catalyst;
a second exhaust bypass passage branching off from the exhaust passage at an upstream portion of the turbine while merging again with the exhaust passage at a portion between the upstream side catalyst and the downstream side catalyst;
a first waste gate valve which plays a role in opening and closing the first exhaust bypass passage; and
a second waste gate valve which plays a role in opening and closing the second exhaust bypass passage.

A second aspect of the present invention is the exhaust gas purifying apparatus for a supercharger-equipped internal combustion engine according to the first aspect of the present invention,
wherein the second waste gate valve is set or controlled so as to open under a condition where a boost pressure of the internal combustion engine or a pressure at the exhaust passage is lower compared with that of the first waste gate valve.

A third aspect of the present invention is the exhaust gas purifying apparatus for a supercharger-equipped internal combustion engine according to the first aspect of the present invention,
wherein the exhaust passage includes a first exhaust passage which introduces exhaust gas discharged from a part of cylinders of the internal combustion engine into the turbine, and a second exhaust passage which introduces exhaust gas discharged from the rest of the cylinders of the internal combustion engine into the turbine,
wherein the first exhaust bypass passage is a passage branched off from the first exhaust passage,
wherein the second exhaust bypass passage is a passage branched off from the second exhaust passage,
wherein at least the second waste gate valve out of the first waste gate valve and the second waste gate valve is controlled or set so as to open in a case in which there is a request to elevate a temperature of the downstream side catalyst, and
wherein the exhaust gas purifying apparatus further includes air fuel ratio control means which makes a difference between an air fuel ratio of the exhaust gas flowing through the first exhaust passage and an air fuel ratio of the exhaust gas flowing through the second exhaust passage in a case in which there is the request to elevate the temperature of the downstream side catalyst.

Advantages of the Invention

According to the first aspect of the present invention, a part of the exhaust gas becomes able to bypass not only the turbine but also the upstream side catalyst when a boost pressure or an exhaust gas pressure is adjusted by opening the exhaust bypass passages bypassing the turbine, and thereby a back pressure of the internal combustion engine can be effectively decreased at the time of using the exhaust bypass passages. In addition, according to the present invention, the exhaust gas which bypassed the upstream side catalyst is introduced into the upper stream of the downstream side catalyst. This makes it possible to purify, by the downstream side catalyst, the exhaust gas that bypassed the upstream side catalyst, while suppressing an increase in the back pressure of the internal combustion engine. That is to say, according to the present invention, it is possible to favorably combine the realization of the prevention of an excessive back pressure rise and the securement of an exhaust gas emission performance at the time of using the exhaust bypass passages.

According to the second aspect of the present invention, it becomes possible to effectively draw out an effect of inhibiting the back pressure from increasing under a condition where only any one of the first waste gate valve and the second waste gate valve is opened, compared with a condition under which only the first waste gate valve is opened.

According to the third aspect of the present invention, in the case in which it is recognized that there is the request for elevating the temperature of the downstream side catalyst, exhaust gases that differ in air fuel ratio are merged with each other at the upper stream of the downstream side catalyst, and then both the exhaust gases come to flow into the downstream side catalyst. As a result, at the upper stream of the downstream side catalyst or therewithin, unburned components contained in a relatively-rich exhaust gas react with oxygen contained in a relatively-lean exhaust gas after merging with each other, and thereby the floor temperature of the downstream side catalyst rises. That is to say, according to the present invention, it is possible to effectively utilize the reaction between the rich exhaust gas and lean exhaust gas discharged from the cylinders at the downstream side catalyst, thereby elevating the temperature of the downstream side catalyst.

DESCRIPTION OF SYMBOLS 10 internal combustion engine
12 intake passage
14, 40 exhaust passage
14a exhaust manifold
16 turbocharger
16a, 42a turbine
16b, 42b compressor
18 first front stage catalyst (S/C1)
20 second front stage catalyst (S/C2)
22 underfloor catalyst (U/F)
24, 46 first exhaust bypass passage
26, 48 second exhaust bypass passage
28, 50 first waste gate valve
30, 52 second waste gate valve
40a first exhaust passage
40b second exhaust passage
42 twin entry turbocharger
44 open/close valve
54 boost pressure sensor
56 ECU (Electronic Control Unit)
58 fuel injection valve

BEST MODE FOR CARRYING OUT THE INVENTION

First Embodiment

Figure 1:
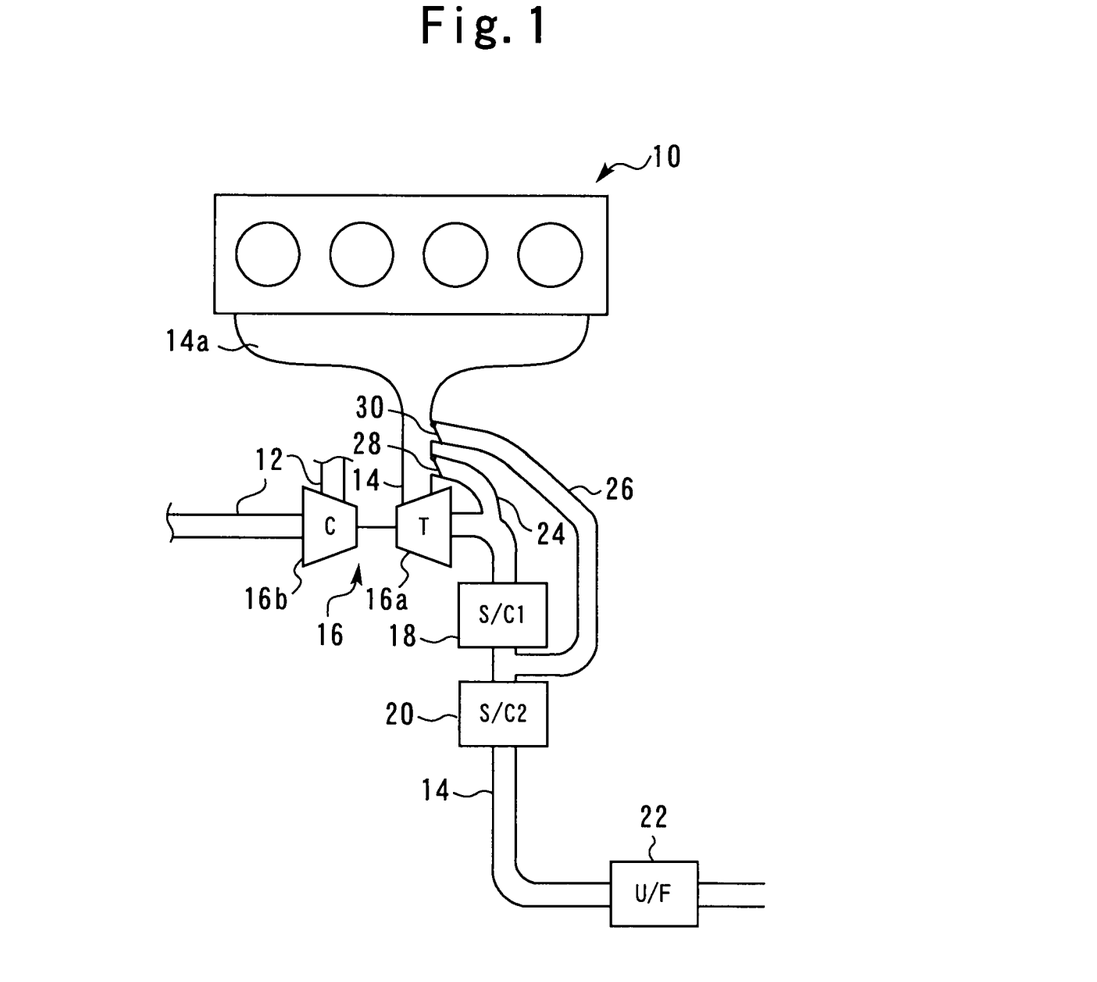
FIG. 1 is a diagram for explaining a configuration of an internal combustion engine system having an exhaust gas purifying apparatus according to a first embodiment of the present invention.

FIG. 1 is a diagram for explaining a configuration of an internal combustion engine system having an exhaust gas purifying apparatus according to a first embodiment of the present invention. The internal combustion engine 10 shown in FIG. 1 includes an intake passage 12 for taking air into cylinders, and an exhaust passage 14 through which exhaust gas discharged from the cylinders flows. In addition, the internal combustion engine 10 is provided with a turbocharger 16.

The turbocharger 16 includes a turbine 16a which is driven by the exhaust energy of exhaust gas, and a compressor 16b which is integrally coupled to the turbine 16a and rotated by the exhaust energy of the exhaust gas that enters the turbine 16a. The turbine 16a is disposed at some point in the above described exhaust passage 14, and the compressor 16b is disposed at some point in the above described intake passage 12.

At a downstream side of the turbine 16a in the exhaust passage 14, a first front stage catalyst (S/C1) 18, a second front stage catalyst (S/C2) 20 and an underfloor catalyst (U/F) 22 that can purify the exhaust gas are placed in series in order from the upstream side. The front stage catalysts 18 and 20 are catalysts which are placed immediately below an exhaust manifold 14a (so called, start catalysts) so that the exhaust gas discharged from the cylinders can be instantaneously purified at a cold condition immediately after the start of the internal combustion engine 10. In addition, the underfloor catalyst 22 is a catalyst that is disposed at the underfloor of the vehicle.

The system of the present embodiment has a first exhaust bypass passage 24 and a second exhaust bypass passage 26. The first exhaust bypass passage 24 is arranged so as to branch off from the exhaust passage 14 at an upstream portion of the turbine 16a and merge again with the exhaust passage 14 at a portion between the turbine 16a and the first front stage catalyst 18. That is to say, the first exhaust bypass passage 24 is arranged as a passage bypassing the turbine 16a.

In addition, the second exhaust bypass passage 26 is arranged so as to branch off from the exhaust passage 14 at an upstream portion of the turbine 16a and merge again with the exhaust passage 14 at a portion between the first front stage catalyst 18 and the second front stage catalyst 20. That is to say, the second exhaust bypass passage 26 is arranged as a passage bypassing the first front stage catalyst 18 as well as the turbine 16a.

Further, some point in the first exhaust bypass passage 24, more specifically an upper side end of the exhaust gas stream in the first exhaust bypass passage 24, is provided with a first waste gate valve (hereinafter, abbreviated as a "first WGV (Waste Gate Valve)") 28 which plays a role in opening and closing the first exhaust bypass passage 24. In addition, some point in the second exhaust bypass passage 26, more specifically an upper side end of the exhaust gas stream in the second exhaust bypass passage 26, is provided with a second waste gate valve (hereinafter, abbreviated as a "second WGV (Waste Gate Valve)") 30 which plays a role in opening and closing the second exhaust bypass passage 26. These WGVs 28 and 30 are herein supposed to be pressure-regulated type valves that are configured so as to open when a boost pressure or an exhaust gas pressure reaches to a predetermined setting pressure. According to the thus-constructed WGVs 28 and 30, when the boost pressure or the exhaust gas pressure is higher than the setting pressure, a part of the exhaust gas discharged from the cylinders passes through the exhaust bypass passages 24 and 26 to bypass the turbine 16a. This makes it possible to control the boost pressure so as not to be too high.

Furthermore, in the present embodiment, the setting pressure at the time of opening the second WGV 30 is set low relative to the setting pressure at the time of opening the first WGV 28. That is to say, in the present embodiment, a setting is made such that the second WGV 30 opens in advance of the first WGV 28 in a state in which the exhaust gas pressure at the upstream side of the turbine 16a becomes higher.

Figure 2:
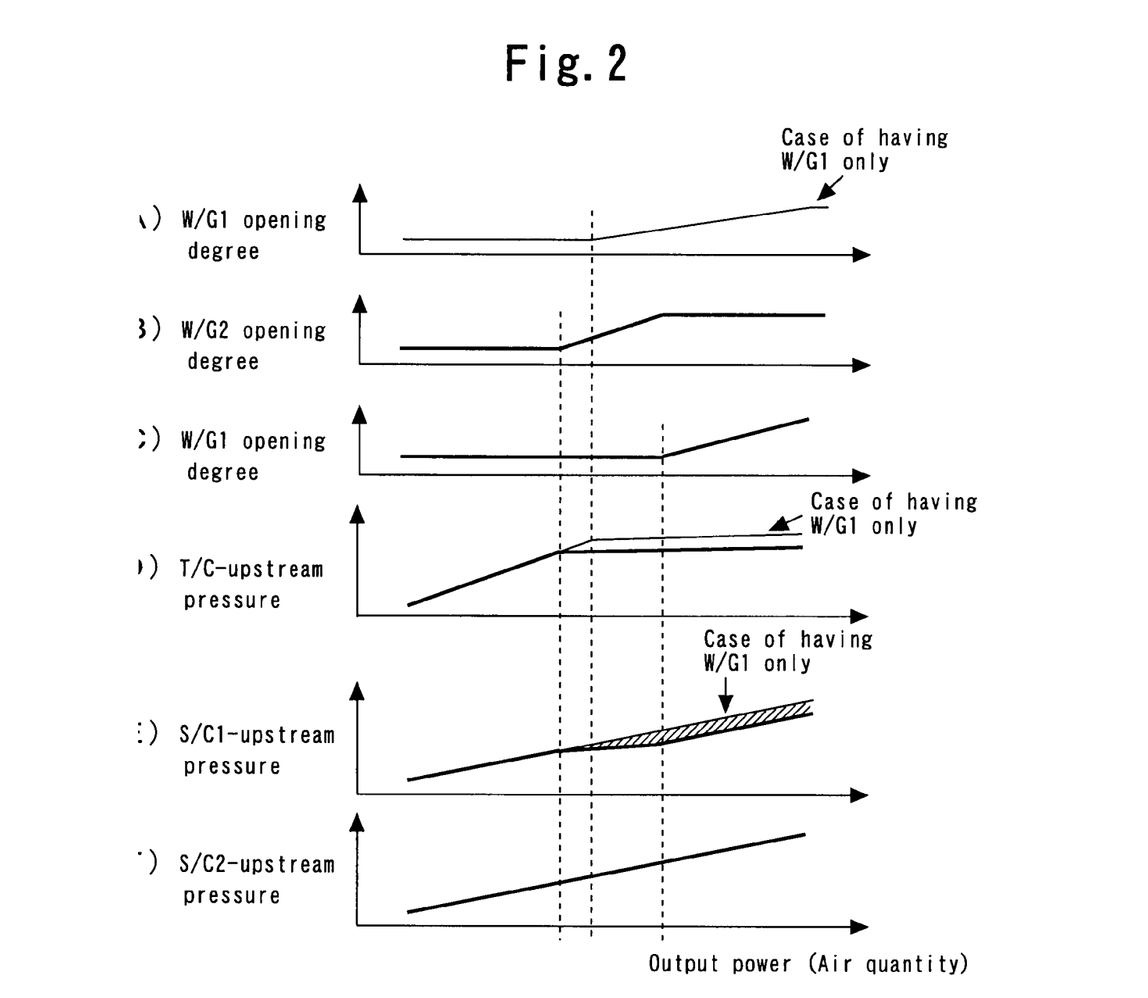
FIG. 2 is a diagram illustrating the operation of the system according to the first embodiment of the present invention compared with the operation of a system equipped with a first WGV only (system which is referred to for comparison with the system of the present embodiment)

FIG. 2 is a diagram illustrating the operation of the system according to the first embodiment of the present invention compared with the operation of a system equipped with a first WGV only (system which is referred to for comparison with the system of the present embodiment). To be more specific, the waveforms indicated by the thin lines in FIGS. 2(A), (D) and (E) show the operation of the system equipped with only the first WGV (more specifically, the system in which the second exhaust bypass passage and the second WGV are removed from the system of the present embodiment). On the other hand, the waveforms indicated by the thick lined in FIGS. 2(B) to (F) show the operation of the system of the present embodiment. Note that in FIG. 2, a "W/G1 opening degree" and a "W/G2 opening degree" show the respective opening degrees of the first WGV 28 and the second WGV 30. In addition, a "T/C-upstream pressure", a "S/C1-upstream pressure" and a "S/C2-upstream pressure" show the respective waveforms of the exhaust gas pressure at the upstream side of the turbine 16a, the exhaust gas pressure at the part between the turbine 16a and the first front stage catalyst 18, and the exhaust gas pressure at the part between the first front stage catalyst 18 and the second front stage catalyst 20. Furthermore, the horizontal axis of FIG. 2 is the maximum output power (intake air quantity) of the internal combustion engine 10.

First, the operation of the system which is a target for comparison and equipped with only the first WGV is now described. In the case of this system, as shown in FIG. 2(A), the first WGV is opened when the boost pressure reaches the setting pressure of the first WGV with an increase of the maximum output power of the internal combustion engine 10. As a result of this, since a part of the exhaust gas bypasses the turbine, the increase in the T/C-upstream pressure becomes slow as shown in FIG. 2(D) when compared to that before the first WGV is opened. The gas amount flown into the turbine with an increase in the maximum output power of the internal combustion engine 10 increases, and thereby the T/C-upstream pressure after the first WGV is opened gradually increases with an increase in the maximum output power. Note that since an arrangement in this system is made such that the gas after bypassing the turbine merges with the gas which passed through the turbine at the upper stream of the first front stage catalyst, as shown in FIGS. 2(E) and (F), the S/C1-upstream pressure and the S/C2-upstream pressure increase with an increase in the maximum output power regardless of the opening or closing of the first WGV.

On the other hand, in the system of the present embodiment, an arrangement is made such that as the maximum output power of the internal combustion engine 10 increases, the first WGV 28 is first opened as shown in FIG. 2(B) and the second WGV 30 is then opened as shown in FIG. 2(C). In the case of the system of the present embodiment, the gas that passed through the exhaust bypass passages 24 and 26 surely merges with the gas flowing through the exhaust passage 14 at the time of passing through the part between the first front stage catalyst 18 and the second front stage catalyst 20. Because of this, as shown in FIG. 2(F), the S/C2-upstream pressure is similar to that in the system equipped with the first WGV only.

In contrast to this, the system of the present embodiment differs from the system equipped with the first WGV only in the S/C1-upstream pressure. More specifically, in a state in which only the second WGV 30 is opened in the system configuration according to the present embodiment, a part of the exhaust gas discharged from the cylinders bypasses not only the turbine 16a but also the first front stage catalyst 18. As a result, as shown in FIG. 2(E), it becomes possible to reduce the S/C1-upstream pressure compared to the system which is equipped with the first WGV only and bypassing the turbine only. Moreover, since the S/C1-upstream pressure (that is, the outlet pressure of the turbine 16a) can be reduced, as shown in FIG. 2(D), the T/C-upstream pressure (that is, the back pressure of the internal combustion engine 10) at the time of executing the control to open the WGV can be reduced. This makes it possible to suppress the occurrence of knock and improve fuel economy and the maximum output power due to the reduction of the exhaust gas temperature.

In addition, in the system of the present embodiment, an arrangement is made such that a catalyst which functions as a so-called start catalyst is installed in the exhaust passage 14 in a manner in which it is divided into two front stage catalysts 18 and 20 and placed in series. Moreover, an arrangement is made such that the exhaust gas that bypassed the first front stage catalyst 18 is introduced into the upper stream of the second front stage catalyst 20. As a result of this, the system of the present embodiment makes it possible to purify, by the second front stage catalyst 20 which is a start catalyst, the exhaust gas that bypassed the first front stage catalyst 18, while suppressing an increase in the back pressure of the internal combustion engine 10 by reducing the S/C1-upstream pressure. That is to say, it is possible to favorably combine the realization of the prevention of an excessive back pressure rise and the securement of the exhaust gas emission performance at the time of using the exhaust bypass passages 24 and 26.

Furthermore, in the present embodiment as described above, a setting is made such that the second WGV 30 is opened in advance of the first WGV 28. Contrary to such setting, if a setting is made such that the first WGV 28 is opened in advance of the second WGV 30, no difference concerning the S/C1-upstream pressure is found compared to the system equipped with the first WGV only in a state in which only the first WGV 28 is opened. In addition, if the second WGV 30 is then opened, a reduction effect of the S/C1-upstream pressure compared to the system equipped with only the first WGV becomes able to be found. That is to say, in the setting in which the first WGV 28 is opened in advance of the second WGV 30, the area represented by applying a hatch pattern in FIG. 2(E) (area for showing the reduction effect of the S/C1-upstream pressure) is reduced compared to the setting in which the second WGV 30 is opened in advance of the first WGV 28. As so far described, in the present embodiment, the setting in which the second WGV 30 is opened in advance of the first WGV 28 can effectively draw out an effect of inhibiting the back pressure from increasing when the boost pressure is adjusted by the WGVs 28 and 30.

Meanwhile, in the first embodiment, which has been described above, description is made taking an example in which the WGVs 28 and 30 are the pressure-regulated type valves that are configured so as to open when the boost pressure or the exhaust gas pressure reaches to the predetermined setting pressure. However, the first waste gate valve and second waste gate valve according to the present invention are not limited to this and may be, for example, motor-driven valves which is controlled so as to open and close on the basis of, for example, the boost pressure of intake air detected by a boost pressure sensor (not shown).

Moreover, in the first embodiment, which has been described above, description is made taking an example, in which the two front stage catalysts 18 and 20 are placed in the exhaust passage 14 in series and the arrangement is made such that the exhaust gas that bypassed the first front stage catalyst 18 is returned upstream of the second front stage catalyst 20. However, in place of such configuration, in a case, for example, in which a configuration with a single front stage catalyst and an underfloor catalyst installed downstream of the front stage catalyst is provided, an arrangement may be made such that the exhaust gas that bypassed the front stage catalyst is returned upstream of the underfloor catalyst.

Note that in the first embodiment, which has been described above, the first front stage catalyst 18 corresponds to the "upstream side catalyst" according to the above-described first aspect of the present invention; and the second front stage catalyst 20 to the "downstream side catalyst" according to the above-described first aspect of the present invention, respectively.

Second Embodiment

Next, a second embodiment of the present invention will be described with reference to FIGS. 3 and 4.

Figure 3:
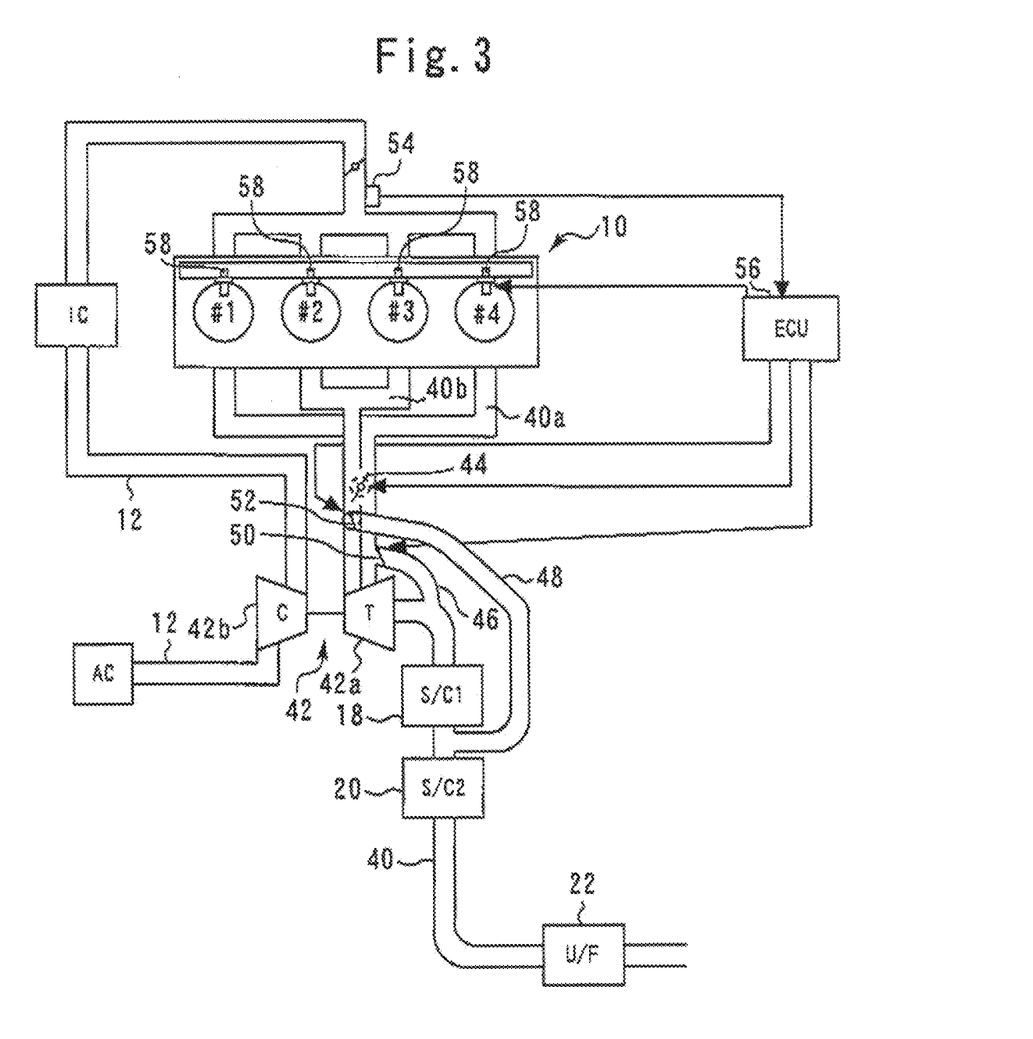
FIG. 3 is a diagram for explaining a configuration of an internal combustion engine system having an exhaust gas purifying apparatus according to a second embodiment of the present invention.

FIG. 3 is a diagram for explaining a configuration of an internal combustion engine system having an exhaust gas purifying apparatus according to a second embodiment of the present invention. It is supposed herein that the explosion sequence of the internal combustion engine 10 is No. 1 to No. 3, to No. 4, and to No. 2. Note that in FIG. 2, the same element as that shown in above-described FIG. 1 is given the same reference character thereby omitting or simplifying the description thereof.

An exhaust passage 40 of the present embodiment includes a first exhaust passage 40a which introduces the exhaust gas discharged from a part of the cylinders (No. 1 and No. 4) of the internal combustion engine 10 into the turbine 42a, and a second exhaust passage 40b which introduces the exhaust gas discharged from the rest of the cylinders (No. 2 and No. 3) of the internal combustion engine 10 into the turbine 42a. A turbocharger 42 of the present embodiment is a turbocharger which receives supplies of the exhaust gases individually from the above-mentioned part of the cylinders (No. 1 and No. 4) and the above-mentioned rest of the cylinders (No. 2 and No. 3) via the first exhaust passage 40a and the second exhaust passage 40b configured as the above, that is, a so-called twin entry turbocharger.

In addition, as shown in FIG. 3, the first exhaust passage 40a and the second exhaust passage 40b have portions which are adjacent to each other. Further, at the portions, an open/close valve 44 is installed for switching between a state in which the first exhaust passage 40a and the second exhaust passage 40b are communicated with each other and a state in which the first exhaust passage 40a and the second exhaust passage 40b are blocked from each other. According to such a configuration, controlling the opening and closing of the open/close valve 44 makes it possible to adjust an exhaust system volume and the back pressure.

The present embodiment also includes a first exhaust bypass passage 46 which bypasses the turbine 42a, and a second exhaust bypass passage 48 which bypasses the first front stage catalyst 20 as well as the turbine 42a. These exhaust bypass passages 46 and 48 are connected to the respective exhaust passages 40a and 40b independent of each other at an upper stream side of the turbine 42a. Note that the arrangement herein is illustrated by an example of the first exhaust bypass passage 46 is connected to the second exhaust passage 40a and the second exhaust bypass passage 48 is connected to the first exhaust passage 40b.

Furthermore, in the present embodiment, too, a first waste gate valve (first WGV) 50 which plays a role in opening and closing the first exhaust bypass passage 46 is installed at some point in the first exhaust bypass passage 46, more specifically, an upper side end of the exhaust gas stream in the first exhaust bypass passage 46. In addition, a second waste gate valve (second WGV) 52 which plays a role in opening and closing the second exhaust bypass passage 48 is installed at some point in the second exhaust bypass passage 48, more specifically, an upper side end of the exhaust gas stream in the second exhaust bypass passage 48. It is herein supposed that these WGVs 50 and 52 are motor-driven valves, which opens and closes on the basis of the boost pressure detected by a boost pressure sensor 54 installed in the intake passage 12.

Moreover, the system of the present embodiment includes an electronic control unit (ECU) 56. The ECU 56, which is connected with various types of sensors as well as the above described sensor to detect an operating state of the internal combustion engine 10, is connected with various types of actuators such as a fuel injection valve 58 for supplying fuel into the internal combustion engine 10 as well as the WGVs 50 and 52 described above to control the operating state of the internal combustion engine 10. Based on the outputs of such sensors, the ECU 56 controls the operating state of the internal combustion engine 10.

Meanwhile, as an improvement in fuel economy of an internal combustion engine progresses, the fuel pumped to the internal combustion engine becomes efficiently converted into its output power. Because of this, exhaust loss is reduced, and the exhaust gas temperature is likely to be low. As a result, there is a concern that in a low output region in which the exhaust gas temperature is originally low, the temperature of a catalyst may not be maintained in a range in which the catalyst exhibits high conversion efficiency. In addition, such a tendency is shown more clearly for a catalyst which is placed at a more downstream side in an exhaust passage.

Accordingly, in the present embodiment, an arrangement is made such that in a case in which there is a request for elevating the temperature of the second front stage catalyst 20, a control to elevate the temperature of the second front stage catalyst 20 is performed by using a configuration which is equipped with two exhaust passages 40a and 40b for the twin entry turbocharger 42 and two exhaust bypass passages 46 and 48. Specifically, the arrangement is made such that in the case in which there is the above request, the WGVs 50 and 52 are both controlled so as to open and an air fuel ratio of the exhaust gas flowing through the first exhaust passage 40a differs from an air fuel ratio of the exhaust gas flowing through the second exhaust passage 40b.

Figure 4:
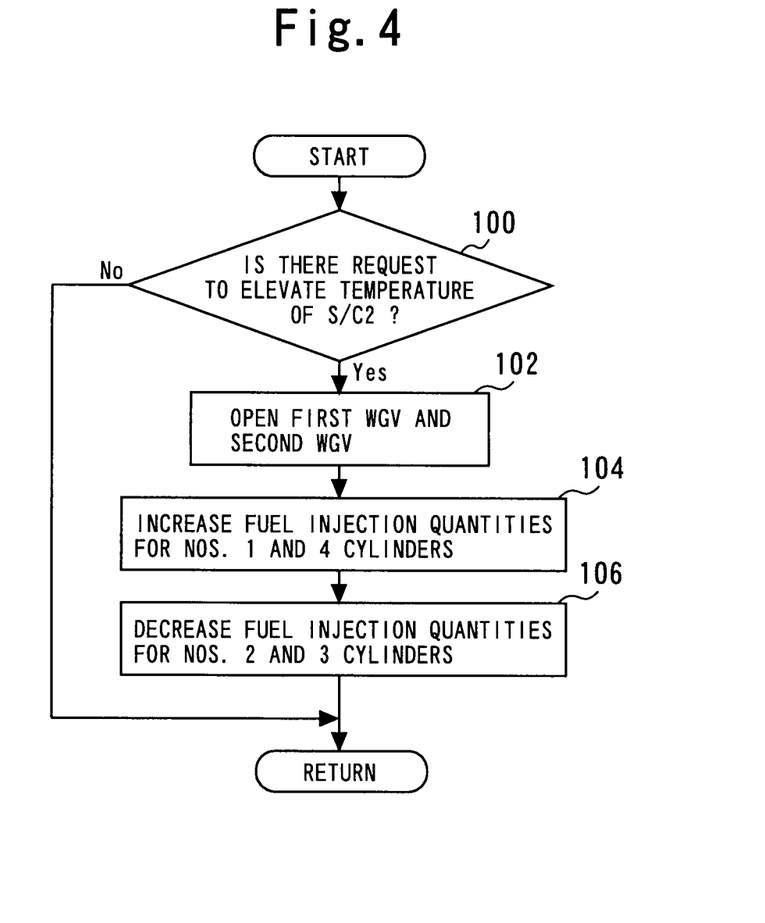
FIG. 4 is a flowchart illustrating a routine that is executed in the second embodiment of the present invention.

FIG. 4 is a flowchart of a routine which the ECU 56 executes in the present second embodiment to implement the above described functionality.

In the routine shown in FIG. 4, first, it is determined whether or not there is a request for elevating the temperature of the second front stage catalyst (S/C2) 20 (step 100). Specifically, the processing of step 100 can be executed by using various types of sensors which the internal combustion engine 10 includes to detect the operating state. To be more specific, it can be determined whether or not there is the request, through the use of such various types of sensors, for example, by judging whether or not the current operating region is a low output region in which the exhaust gas temperature is low, or by judging whether or not an estimated or detected value of the temperature of the second front stage catalyst 20 is smaller than a predetermined value.

If it is determined in above-described step 100 that there is the request for elevating the temperature of the second front stage catalyst 20, the first WGV 50 and the second WGV 52 are both opened (step 102). Next, fuel injection quantities for No. 1 and No. 4 cylinders are increased by a predetermined amount (step 104) and fuel injection quantities for No. 2 and No. 3 cylinders are decreased by a predetermined amount (step 106).

According to the processing of the routine shown in FIG. 4 described so far, in the case in which it is recognized that there is the request for elevating the temperature of the second front stage catalyst 20, the air fuel ratio of the exhaust gas discharged from No. 1 and No. 4 cylinders into the first exhaust passage 40a is changed to a value on a richer side by increasing the fuel injection quantities for those cylinders by the predetermined value. Moreover, in this case, the air fuel ratio of the exhaust gas discharged from No. 2 and No. 3 cylinders to the second exhaust passage 40b is changed to a value on a leaner side by decreasing the fuel injection quantities for those cylinders by the predetermined value.

Also, according to the processing of the above described routine, the first WGV 50 is opened in the case in which the request is recognized. As a result of this, a part of rich exhaust gas flowing through the first exhaust passage 40a is discharged downstream of the first front stage catalyst 18 after passing through the turbine 42a, and the rest part of the rich exhaust gas is discharged into downstream of the first front stage catalyst 18 after passing through the first exhaust bypass passage 46 to bypass the turbine 42a. Furthermore, according to the processing of the above described routine, the second WGV 52 is opened in the case in which the request is recognized. As a result of this, a part of lean exhaust gas flowing through the second exhaust passage 40b is introduced upstream of the second front stage catalyst 20 after passing through the second exhaust bypass passage 48 to bypass the turbine 42a and first front stage catalyst 18.

By the control described above, the rich exhaust gas are merged with the lean exhaust gas at the upper stream of the second front stage catalyst 20, and then both the exhaust gases come to flow into the second front stage catalyst 20. As a result, at an upper stream of the second front stage catalyst 20 or therewithin, unburned components contained in the rich exhaust gas react with oxygen contained in the lean exhaust gas after merging with each other, and thereby the floor temperature of the second front stage catalyst 20 rises. That is to say, according to the processing of the routine described above, it is possible to effectively utilize, at the second front stage catalyst 20 provided at a relatively-downstream side, the reaction between the rich exhaust gas and lean exhaust gas discharged from the cylinders, thereby elevating the temperature of the second front stage catalyst 20.

As described above, the temperature of the second front stage catalyst 20 which is placed at the downstream side of the first front stage catalyst 18 is likely to be lower than that of the first front stage catalyst 18. According to the processing of the present embodiment described so far, it becomes possible to preferably maintain the temperature of the second front stage catalyst 20, which is placed at a thermally-unfavorable condition as described above, at the high level. This makes it possible to prevent the exhaust gas emission performance from deteriorating due to the decrease in the temperature of the second front stage catalyst 20.

Meanwhile, in the second embodiment, which has been described above, both the first WGV 50 and the second WGV 52 are controlled so as to open when it is recognized that there is the request for elevating the temperature of the second front stage catalyst 20. This makes it possible to merge the rich exhaust gas and the lean exhaust gas at the upper stream of the second front stage catalyst 20 without causing a difference in the back pressure between the above-mentioned part of the cylinders (No. 1 and No. 4) and the above-mentioned rest of the cylinders (No. 2 and No. 3), in the system equipped with the first exhaust passage 40a and the second exhaust passage 40b independently for the twin entry turbocharger 42. However, to merge the rich exhaust gas and the lean exhaust gas at the upper stream of the second front stage catalyst 20, the first WGV 50 may not necessarily be controlled so as to open if the second WGV 52 is controlled so as to open.

Furthermore, in the second embodiment, which has been described above, the motor-driven valves 50 and 52 is provided to control so as to open both the first WGV 50 and the second WGV 52 in the case in which it is recognized that there is the request for elevating the temperature of the second front stage catalyst 20. However, the waste gate valve of the present invention is not limited to such waste gate valve that is motor driven or the like, and may be, for example, a pressure-regulated type valve that is set so as to open in an operating region in which it is recognized that there is the above described request.

Note that in the second embodiment, which has been described above, the "air fuel ratio control means" according to the above-described third aspect of the present invention is implemented by the ECU 56 executing the processing of above-described steps 100, 104 and 106.

The invention claimed is:

1. An exhaust gas purifying apparatus for a turbocharged internal combustion engine, comprising:
 a turbocharger which includes, in an exhaust passage, a turbine which is driven by exhaust energy of the internal combustion engine;
 an upstream side catalyst which is disposed in the exhaust passage and purifies exhaust gas;
 a downstream side catalyst which is disposed in the exhaust passage at a downstream side of the upstream side catalyst and purifies the exhaust gas;
 a first exhaust bypass passage branching off from the exhaust passage at an upstream portion of the turbine while merging again with the exhaust passage at a portion between the turbine and the upstream side catalyst, the first exhaust bypass passage bypassing the turbine;
 a second exhaust bypass passage branching off from the exhaust passage at an upstream portion of the turbine while merging again with the exhaust passage at a portion between the upstream side catalyst and the downstream side catalyst;
 a first waste gate valve which plays a role in opening and closing the first exhaust bypass passage; and a second waste gate valve which plays a role in opening and closing the second exhaust bypass passage, wherein in a state in which a pressure of exhaust gas at an upstream side of the turbine is increasing, the second waste gate valve is set or controlled so as to open at a boost pressure of the internal combustion engine or at a pressure at the exhaust passage that is lower than a boost pressure of the internal combustion engine or than a pressure at the exhaust passage at each of which the first waste gate valve opens.

2. An exhaust gas purifying apparatus for a turbocharged internal combustion engine, the comprising:

a turbocharger which includes, in an exhaust passage, a turbine which is driven by exhaust energy of the internal combustion engine;

an upstream side catalyst which is disposed in the exhaust passage and purifies exhaust gas;

a downstream side catalyst which is disposed in the exhaust passage at a downstream side of the upstream side catalyst and purifies the exhaust gas;

a first exhaust bypass passage branching off from the exhaust passage at an upstream portion of the turbine while merging again with the exhaust passage at a portion between the turbine and the upstream side catalyst;

a second exhaust bypass passage branching off from the exhaust passage at an upstream portion of the turbine while merging again with the exhaust passage at a portion between the upstream side catalyst and the downstream side catalyst;

a first waste gate valve which plays a role in opening and closing the first exhaust bypass passage; and a second waste gate valve which plays a role in opening and closing the second exhaust bypass passage, wherein the exhaust passage includes a first exhaust passage which introduces exhaust gas discharged from a part of cylinders of the internal combustion engine into the turbine, and a second exhaust passage which introduces exhaust gas discharged from the rest of the cylinders of the internal combustion engine into the turbine, wherein the first exhaust bypass passage is a passage branched off from the first exhaust passage, wherein the second exhaust bypass passage is a passage branched off from the second exhaust passage, wherein at least the second waste gate valve out of the first waste gate valve and the second waste gate valve is controlled or set so as to open in a case in which there is a request to elevate a temperature of the downstream side catalyst, and wherein the exhaust gas purifying apparatus further includes:

a fuel injection valve which supplies fuel into the internal combustion engine; and an air fuel ratio controller which is configured to change a fuel injection quantity for a cylinder communicated with the first exhaust passage with respect to a fuel injection quantity for a cylinder communicated with the second exhaust passage in order to make a difference between an air fuel ratio of the exhaust gas flowing through the first exhaust passage and an air fuel ratio of the exhaust gas flowing through the second exhaust passage, in a case in which there is the request to elevate the temperature of the downstream side catalyst.

* * * * *